United States Patent
Fowler et al.

(10) Patent No.: US 12,238,415 B2
(45) Date of Patent: Feb. 25, 2025

(54) CAMERA HAVING VIDEO STREAM INDICATOR

(71) Applicant: OmniVision Technologies, Inc., Santa Clara, CA (US)

(72) Inventors: Boyd Fowler, Sunnyvale, CA (US); Devang Patel, Fremont, CA (US); Eiichi Funatsu, San Jose, CA (US); Andreas Suess, San Jose, CA (US); Kevin Johnson, Kildeer, IL (US)

(73) Assignee: OmniVision Technologies, Inc., Santa Clara, CA (US)

( * ) Notice: Subject to any disclaimer, the term of this patent is extended or adjusted under 35 U.S.C. 154(b) by 114 days.

(21) Appl. No.: 18/356,316

(22) Filed: Jul. 21, 2023

(65) Prior Publication Data

US 2025/0030941 A1    Jan. 23, 2025

(51) Int. Cl.
*H04N 23/66*     (2023.01)
*H04N 23/50*     (2023.01)
*H04N 23/667*    (2023.01)
*H04N 23/80*     (2023.01)

(52) U.S. Cl.
CPC ............. *H04N 23/66* (2023.01); *H04N 23/50* (2023.01); *H04N 23/667* (2023.01); *H04N 23/80* (2023.01)

(58) Field of Classification Search
CPC ...... H04N 23/66; H04N 23/50; H04N 23/667; H04N 23/80
See application file for complete search history.

(56) References Cited

U.S. PATENT DOCUMENTS

| | | | | |
|---|---|---|---|---|
| 5,822,542 A * | 10/1998 | Smith | ...................... | H04N 5/76 348/E7.086 |
| 6,067,417 A * | 5/2000 | Wise | ...................... | H04N 19/42 712/201 |
| 6,173,388 B1 * | 1/2001 | Abercrombie | ........ | G06F 9/3885 710/22 |
| 10,000,154 B2 | 6/2018 | Schondorf et al. | | |
| 10,015,502 B2 * | 7/2018 | Jeong | ........................ | H04N 9/79 |
| 10,403,325 B2 | 9/2019 | Land et al. | | |
| 2008/0285087 A1 * | 11/2008 | Perkins | ..................... | H04N 9/12 348/383 |
| 2013/0334401 A1 * | 12/2013 | Huang | .................... | H04N 25/76 250/208.1 |
| 2020/0092493 A1 * | 3/2020 | McCauley | .............. | H04N 23/53 |
| 2022/0179821 A1 * | 6/2022 | Chellappan | .............. | G06F 13/24 |

* cited by examiner

*Primary Examiner* — Hung H Lam

(57) ABSTRACT

An image sensor comprises: a control block generating a video interface enabled signal, a video interface for receiving the video interface enabled signal, a pixel array for providing a video stream to the video interface, an output port for receiving the video stream from the video interface and outputting the video stream to outside of the image sensor, a stream indicator pin for receiving the video interface enabled signal from the control block when the video interface is receiving the video interface enabled signal from the control block, where a terminal of the video interface receiving the video interface enabled signal is connected to the stream indicator pin by a conductor, and they are sealed in a package of the image sensor.

22 Claims, 6 Drawing Sheets

CAMERA HAVING VIDEO STREAM INDICATOR

FIELD OF THE INVENTION

This disclosure relates to a camera, and particularly a camera having video stream indicator.

BACKGROUND OF THE INVENTION

Image sensors, especially CMOS image sensors, are ubiquitous in video cameras. Video cameras are installed in public and private places. For example, video cameras may be installed in a hospital waiting room, a hotel lobby, an office, or a room where people are working, etc. People may be working in a factory, a good distribution center, an office, or any working places. People who are viewed by the camera may feel uneasy and do not like to be recorded by the video camera without their knowledge.

Accordingly, a video camera having an indicator that can remind people when the camera outputs a video stream is demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
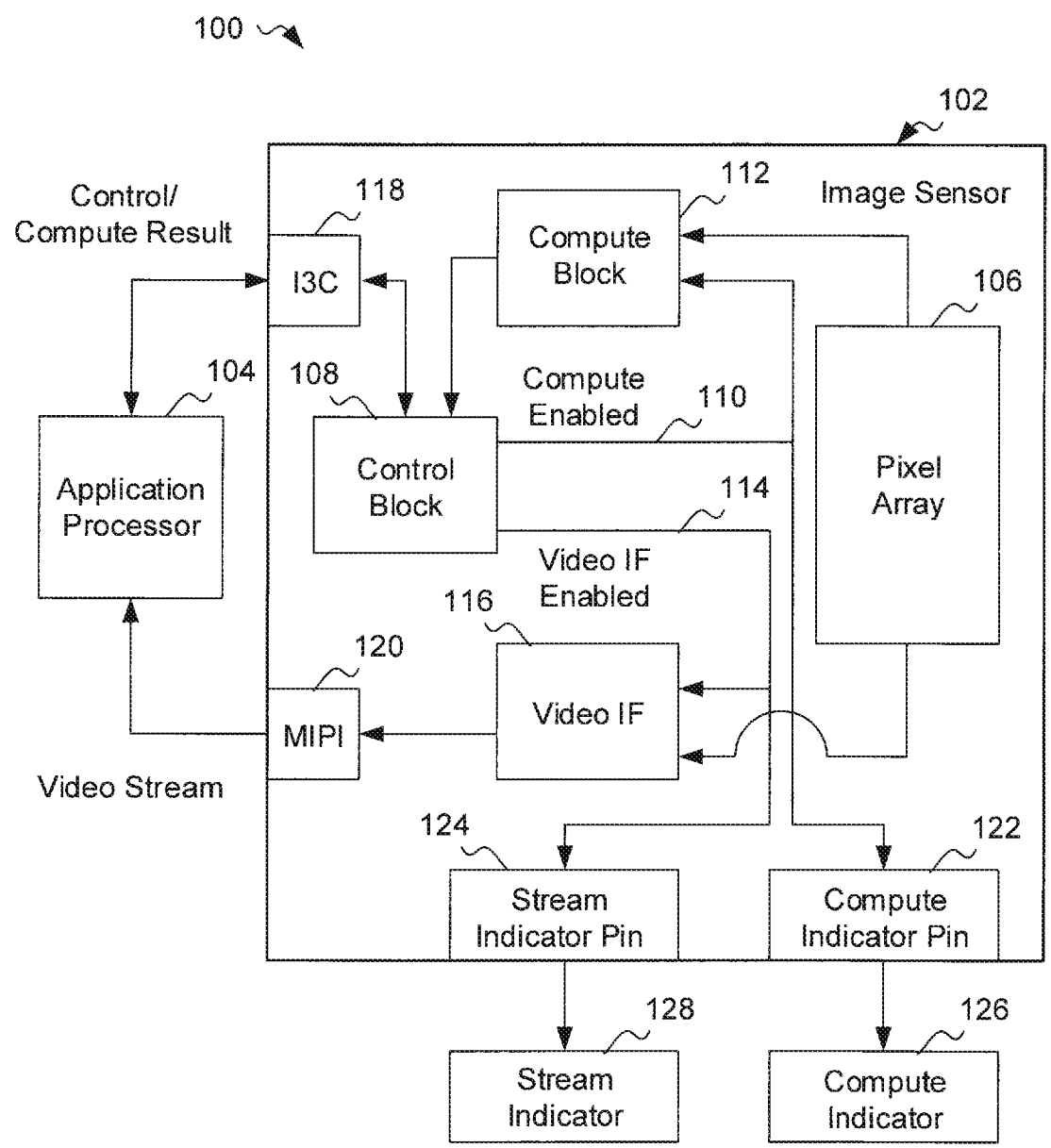
FIG. 1 shows a part of a camera system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

A video camera having an indicator that can remind people when the camera outputs a video stream is disclosed. The output video stream may be used for recording. The indicator is truly controlled by the video stream, and cannot be manipulated by software.

FIG. 1 shows a part of a camera system 100 comprising an image sensor 102, and an application processor 104, a stream indicator 128, and a compute indicator 126, external to image sensor 102, in accordance with an embodiment of the present invention. Here and throughout this disclosure, "compute indicator" has the same meaning as "computation indicator" or "computing indicator". Image sensor 102 may be a CMOS image sensor. Application processor 104 may be a part of a host computer, stream indicator 128 and compute indicator 126 may be LEDs. It is possible that application processor 104 is included in image sensor 102.

Image sensor 102 comprises a pixel array 106, a control block 108, a compute block 112, a video IF (interface) 116, an input/output port I3C 118, an output port MIPI 120, a compute indicator pin 124, and a stream indicator pin 126. Here and throughout this disclosure, "compute block" has the same meaning as "computation block" or "computing block".

I3C 118 is a bidirectional communication port or input/output port, which is connected to application processor 104 external to image sensor 102 with control block 108 inside image sensor 102. Other interfaces such as I2C and SPI are also possible. I3C, I2C, and SPI stand for Improved Inter Integrated Circuit, Inter Integrated Circuit, and Serial Peripheral Interface, respectively. I3C 118 may receive a control command or a command from outside image sensor 102, for example, application processor 104. The command is passed to control block 108. Control block 108 receiving the command may generate a compute enabled signal 110, which is sent to compute block 112. Here and throughout this disclosure, "compute enabled" has the same meaning as "computation enabled" or "computing enabled". Upon receiving compute enabled signal 110, video signals are provided to compute block 112 by pixel array 106. The video signals may be a video stream. Pixel array 106 continuously captures video signals or video stream when image sensor 102 is on.

Compute block 112 computes or analyzes video signals received from pixel array 106 using some algorithms for some purposes, such as object recognition, etc. Compute block 112 produces a compute result, which is provided to control block 108. Here and throughout this disclosure, "compute result" has the same meaning as "computation result" or "computing result". Control block 108 receives the compute result and passes the compute result to I3C 118. I3C 118 receives the compute result and outputs the compute result to outside of image sensor 102, for example, application processor 104 external to image sensor 102. Both control block 108 and I3C 118 are inside image sensor 102. The compute result is not video stream. For example, the compute result may be an information that a human is detected in video signals or in a video frame provided by pixel array 106 using an object recognition algorithm. The algorithm may comprise artificial intelligence (AI) algorithms.

The same signal which enables compute block 112 will set compute indicator pin 122. Compute indicator pin 122 receives compute enabled signal 110 from control block 108, when compute block 112 is receiving compute enabled signal 110 from control block 108. The terminal of compute block 112 receiving compute enabled signal 110 is connected to compute indicator pin 122 by a conductor (hardware). Thus, when compute block 112 receives compute enabled signal 110, compute indicator pin 122 also receives the same compute enabled signal 110, no matter what. There is no possibility to manipulate compute indicator pin 122 using software, because it is connected with conductor to the terminal of compute block 112 receiving compute enabled signal 110, and they and others are sealed inside a package of image sensor 102 from factory. Compute indicator 126 external to image sensor 102 may be connected to compute indicator pin 122. Compute indicator 126 comprises an LED.

On the other hand, I3C 118 may receive a control command or a command from outside of image sensor 102, for example, application processor 104. The command is passed to control block 108. Control block 108 receiving the command may generate a video IF enabled signal 114, which is sent to video IF 116. Upon receiving video IF enabled signal 114, a video stream is provided to video IF 116 by pixel array 106. Pixel array 106 continuously captures video stream or video signals when image sensor 102 is on.

Video IF 116 buffers or interfaces video stream received from pixel array 106. Video IF 116 then passes the video stream received from pixel array 106 to MIPI 120. Output port MIPI (Mobile Industry Processor Interface) is a serial interface between a camera and a host processor, for example MIPI CSI (Camera Serial Interface). MIPI 120 receiving the video stream then outputs the video stream to outside of image sensor 102, for example, application processor 104 external to image sensor 102. Both video IF 116 and MIPI 120 are inside image sensor 102. The video stream may be output by MIPI 120 to other devices or parts external to image sensor 102.

The same signal which enables video IF 116 will set stream indicator pin 124. Stream indicator pin 124 receives video IF enabled signal 114 from control block 108 when video IF 116 is receiving video IF enabled signal 114 from control block 108. The terminal of video IF 116 receiving video IF enabled signal 114 is connected to stream indicator pin 124 by a conductor (hardware). Thus, when video IF 116 receives video IF enabled signal 110, stream indicator pin 124 also receives the same video IF enabled signal 114, no matter what. There is no possibility to manipulate stream indicator pin 124 using software, because it is connected with conductor to the terminal of video IF 116 receiving video IF enabled signal 114, and they and others are sealed inside a package of image sensor 102 from factory. Stream indicator 128 external to image sensor 102 may be connected to stream indicator pin 124. Stream indicator 128 comprises an LED.

Compute indicator 126 and stream indicator 128 may have the same color or different colors, may be in the same or different modes, for example, constant on mode and pulsed mode.

In this way, a video camera having an indicator that can remind people when the camera outputs video stream, and that the indicator is truly controlled by the video stream, and cannot be manipulated by software, can be realized.

Figure 2:
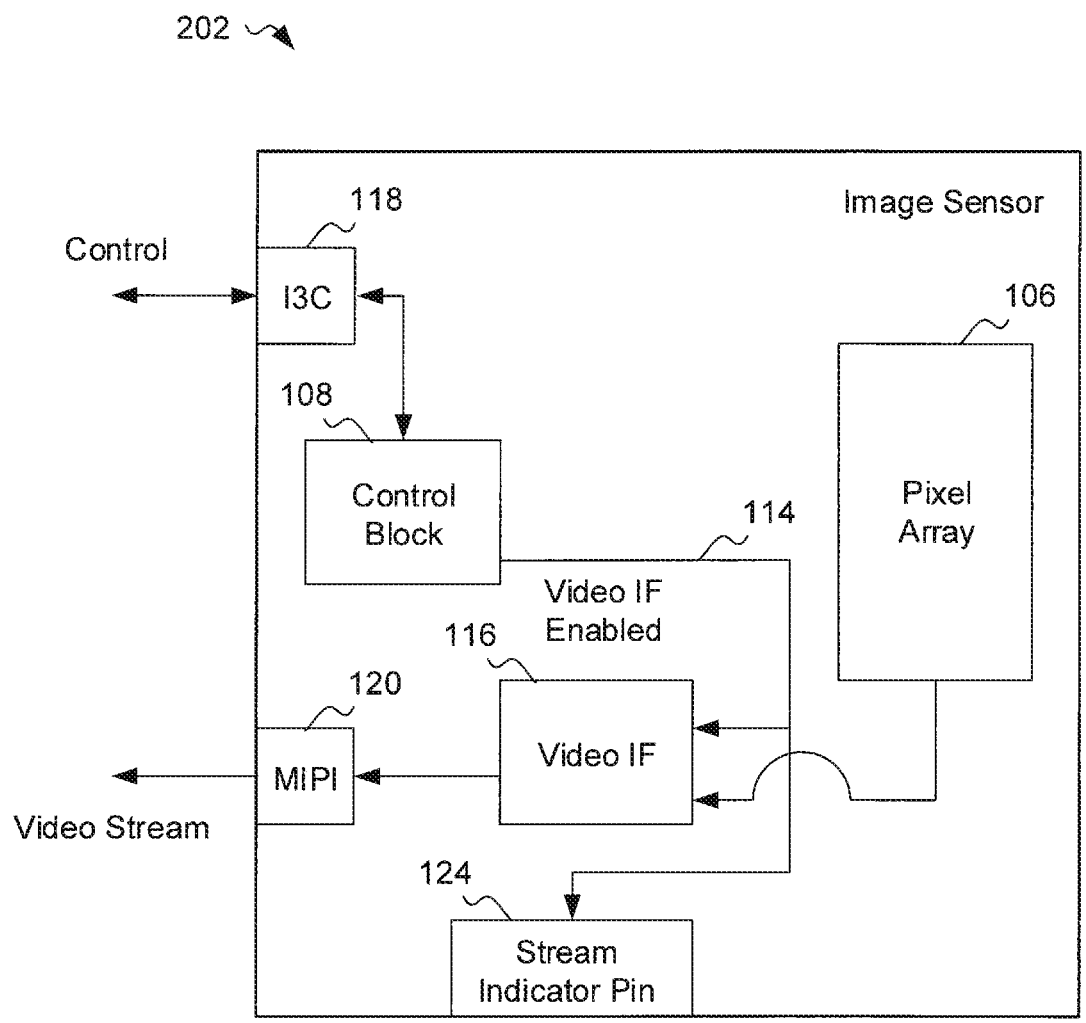
FIG. 2 shows an image sensor of the camera system.

FIG. 2 shows an image sensor 202, in accordance with an embodiment of the present invention. Image sensor 202 is similar to image sensor 102 with omitted compute enabled signal 110, compute block 112, and compute indicator pin 122. Image sensor 202 may output video stream through MIPI 120 to outside image sensor 202, but does not perform any computation inside image sensor 202.

Figure 3:
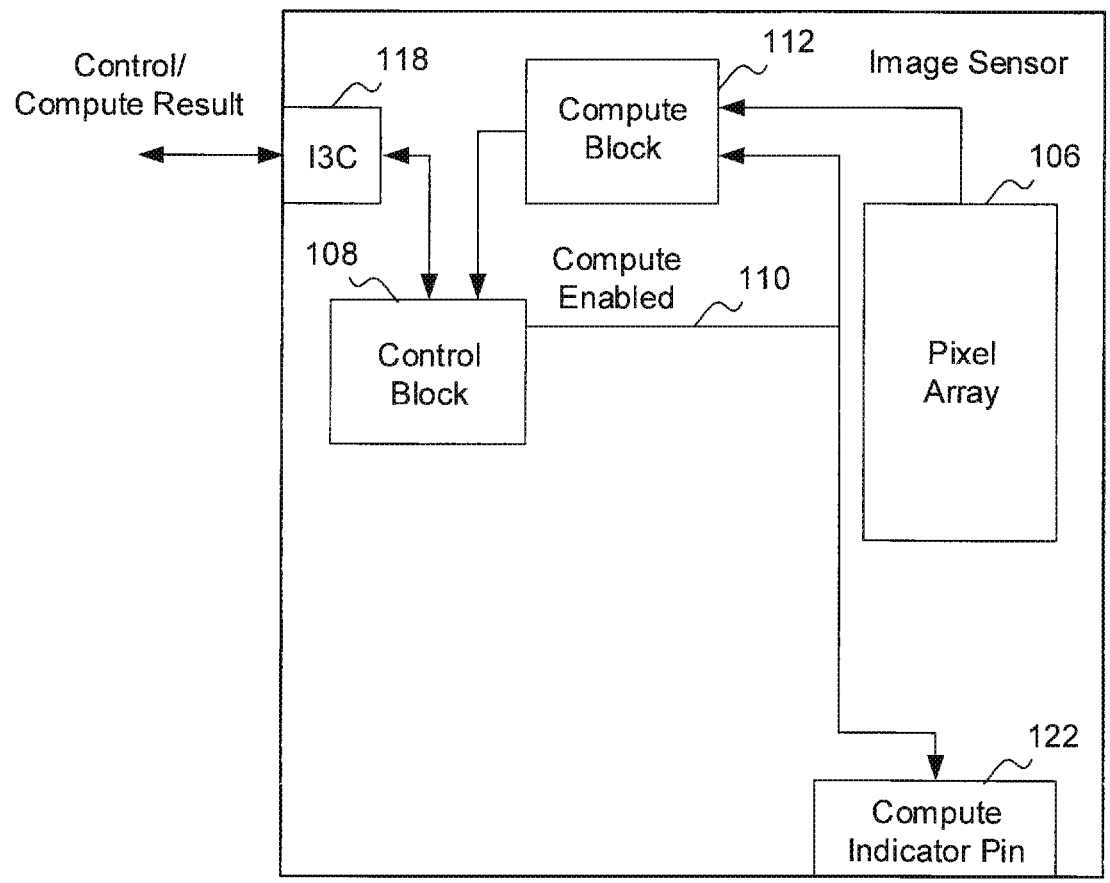
FIG. 3 shows an image sensor of the camera system.

FIG. 3 shows an image sensor 302, in accordance with an embodiment of the present invention. Image sensor 302 is similar to image sensor 102 with omitted video IF enabled signal 114, video IF 116, MIPI output port 120, and stream indicator pin 124. Image sensor 302 may perform computation in compute block 110 inside image sensor 302, but does not output any video stream to outside image sensor 302. I3C 118 may receive command from outside image sensor 302 and output compute result to outside image sensor 302.

Figure 4:
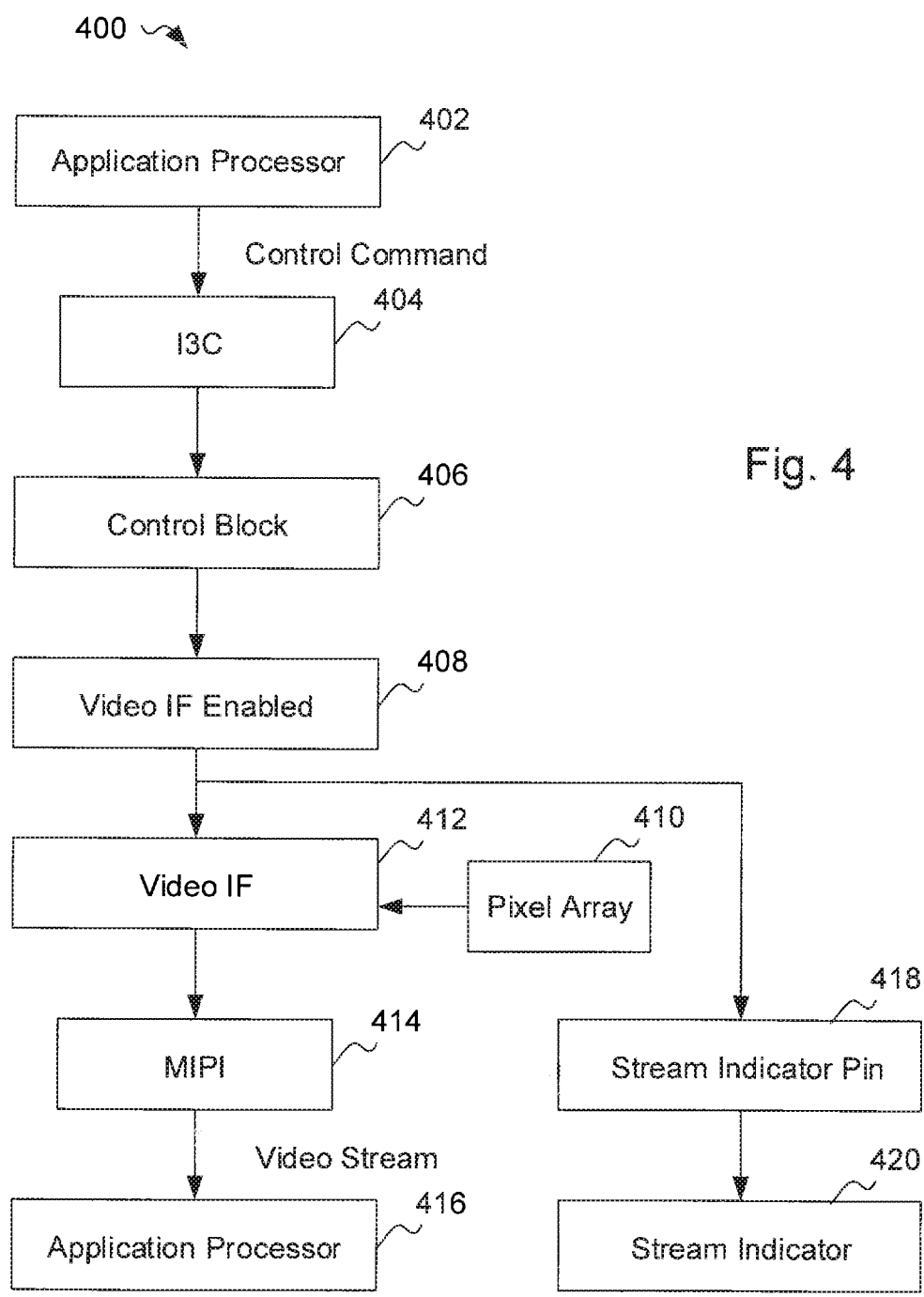
FIG. 4 shows an operation of video streaming process.

FIG. 4 shows an operation of video streaming process 400, in accordance with an embodiment of the present invention. In step 402, application processor 104 external to image sensor 202 or image sensor 102 provides a control command to input/output port I3C 118. In step 404, I3C 118 receives the control command. In step 406, I3C 118 passes the control command to control block 108. In step 408, control block 108 generates video IF enabled signal 114. Control block 108 sends video IF enabled signal 114 to both video IF 116 and stream indicator pin 124 in parallel. The terminal of video IF 116 that receives video IF enabled signal 114 and stream indicator pin 124 are connected with conductor, inside the sealed package of image sensor 202 or image sensor 102. Thus, there is no possibility to cut off this connection unless the package is opened or damaged. In step 410, pixel array 106 provides a video stream to video IF 116. In step 412, upon receiving video IF enabled signal 114, video IF 116 provides the video stream, which is from pixel array 106, to output port MIPI 120. In step 418, when the video stream is provided to MIPI 120, stream indicator pin 124 receives video IF enabled signal 114. In step 420, if stream indicator 128 is connected to stream indicator pin 124, stream indicator 128 will be on. Stream indicator 128 may be an LED. In step 414, MIPI 120 receives the video stream from video IF 116, and outputs the video stream to outside image sensor 202 or image sensor 102, for example, to application processor 104. Application processor 104 may process the video stream, or may further passes the video stream to other parts of camera system 100.

Figure 5:
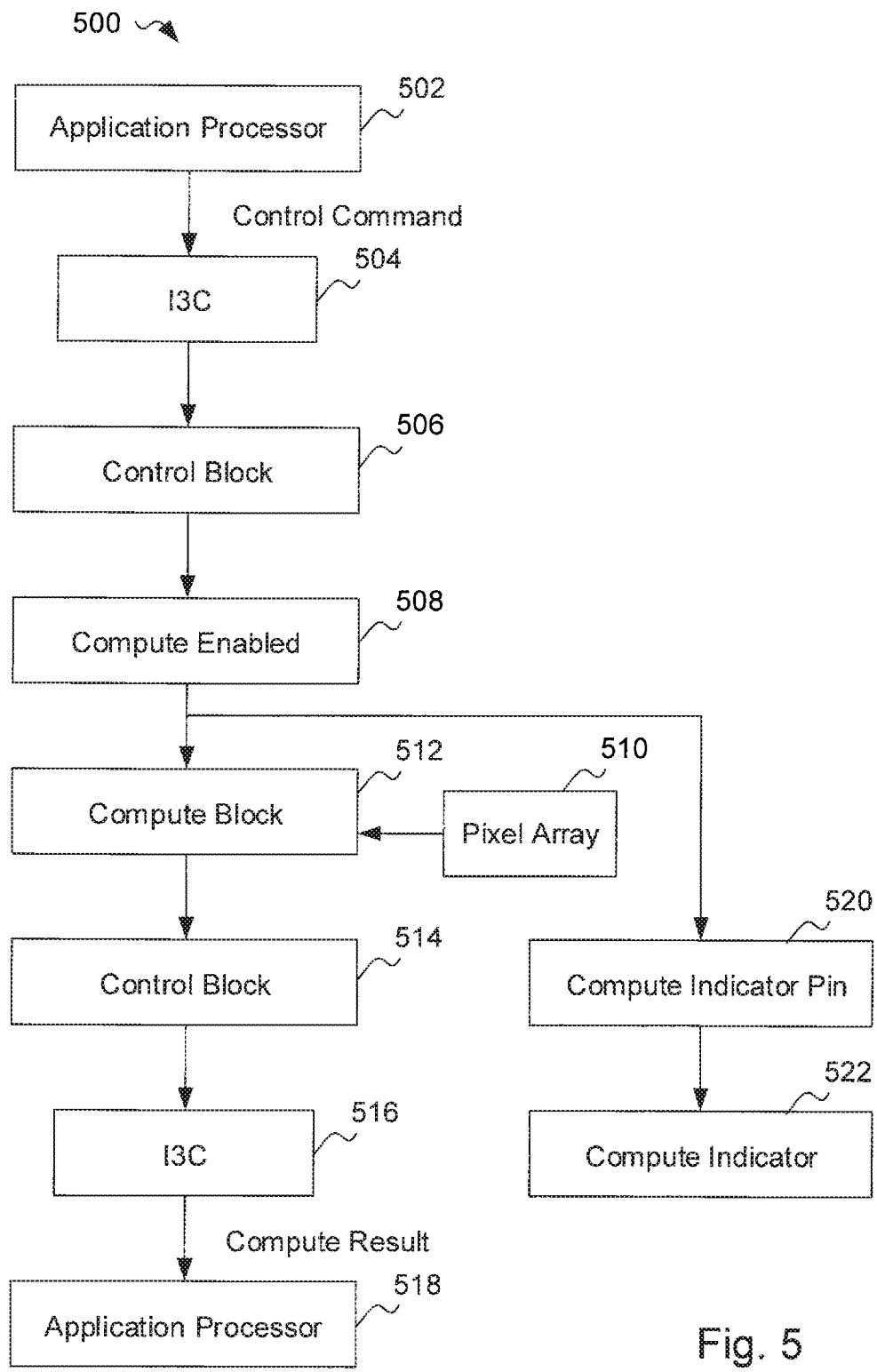
FIG. 5 shows an operation of computation process.

FIG. 5 shows an operation of computation process 500, in accordance with an embodiment of the present invention. In step 502, application processor 104 external to image sensor 302 or image sensor 102 provides a control command to input/output port I3C 118. In step 504, I3C 118 receives the control command. In step 506, I3C 118 passes the control command to control block 108. In step 508, control block 108 generates compute enabled signal 110. Control block 108 sends compute enabled signal 110 to both compute block 112 and compute indicator pin 122 in parallel. The terminal of compute block 112 that receives compute enabled signal 110 and compute indicator pin 122 are connected with conductor inside the sealed package of image sensor 302 or image sensor 102. Thus, there is no possibility to cut off this connection unless the package is opened or damaged. In step 510, pixel array 106 provides video signals to compute block 112. In step 512, upon receiving compute enabled signal 110, compute block 112 performs computation or processing on the video signals received from pixel array 106 to produce a compute result. The compute result is provided to control block 108. In step 514, control block 108 passes the compute result to input/output port I3C 118. In step 518, input/output port I3C 118 outputs the compute result to application process 104 external to image sensor 302 or image sensor 102. In step 520, when compute block 112 is performing computation, compute indicator pin 122 receives compute enabled signal 110. In step 522, if compute indicator 126 is connected to compute indicator pin 122, compute indicator 126 will be on. Compute indicator 126 may be an LED.

Application processor 104 may process the compute result, or may further passes the compute result to other parts of camera system 100. The compute result is not video stream. For example, the compute result may be an information that a human is detected in video signals or in a video frame provided by pixel array 106 using an object recognition algorithm. The algorithm may comprise artificial intelligence (AI) algorithms. The compute result may contain no video image, thus it may contain no individual human image.

Operation of video streaming process 400 may explain operation of image sensor 202. Operation of computation process 500 may explain operation of image sensor 302. Operation of video streaming process 400 and operation of computation process 500 may together explain operation of image sensor 102. In image sensor 102, operation of video streaming process 400 and operation of computation process 500 may be independent.

Stream indicator 128 and compute indicator 126 may work independently in various modes, for example, constant on mode, pulsed mode, color mode, etc.

Figure 6:
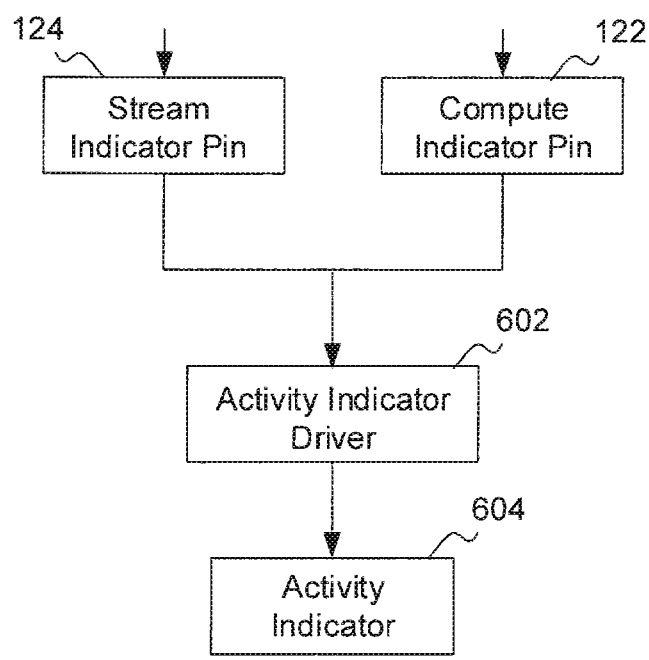
FIG. 6 shows an alternative embodiment.

FIG. 6 shows an embodiment where stream indicator pin 124 and compute indicator pin 122 of FIG. 1 are connected to an activity indicator driver 602 external to image sensor 102, in accordance with an embodiment of the present invention. Activity indicator driver 602 drives a single activity indicator 604. For example, activity indicator 604 is in constant on or solid mode when activity indicator driver 602 receives an on signal from stream indicator pin 124, and in pulsed or blinking mode when activity indicator driver 602 receives an on signal from compute indicator pin 122, or vice versa. If activity indicator driver 602 receives on signals from stream indicator pin 124 and compute indicator pin 122 at the same time, stream indicator pin 124 may be set to have priority. It is also possible to set compute indicator pin 122 to have priority. Activity indicator 604 comprises an LED.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
   an input/output port for receiving a command from outside of the image sensor;
   a control block for receiving the command from the input/output port, and generating a video interface enabled signal;
   a video interface for receiving the video interface enabled signal from the control block;
   a pixel array for providing a video stream to the video interface;
   an output port for receiving the video stream from the video interface, and outputting the video stream to outside of the image sensor;
   a stream indicator pin for receiving the video interface enabled signal from the control block when the video interface is receiving the video interface enabled signal from the control block;
   wherein a terminal of the video interface receiving the video interface enabled signal is connected to the stream indicator pin by a conductor; and
   wherein the video interface, the stream indicator pin, and the conductor connecting the terminal of the video interface and the stream indicator pin are sealed inside a package of the image sensor.

2. The image sensor of claim 1, wherein the input/output port receives the command from an application processor external to the image sensor.

3. The image sensor of claim 1, wherein the output port outputs the video stream to an application processor external to the image sensor.

4. The image sensor of claim 1, wherein a stream indicator external to the image sensor is connected to the stream indicator pin.

5. The image sensor of claim 4, wherein working modes of the stream indicator comprise constant on mode, pulsed mode, and color mode.

6. The image sensor of claim 1, wherein the control block further generates a compute enabled signal, further comprising:
   a compute block for receiving the compute enabled signal from the control block;
   wherein the pixel array provides video signals to the compute block;
   wherein the compute block performs computation on the video signals provided by the pixel array to produce a compute result;
   wherein the control block receives the compute result from the compute block, and passes the compute result to the input/output port;
   wherein the input/output port receives the compute result from the control block, and outputs the compute result to outside of the image sensor;
   a compute indicator pin for receiving the compute enabled signal from the control block when the compute block is receiving the compute enabled signal from the control block;
   wherein a terminal of the compute block receiving the compute enabled signal is connected to the compute indicator pin by a conductor; and
   wherein the compute block, the compute indicator pin, and the conductor connecting the terminal of the compute block and the compute indicator pin are further sealed inside the package of the image sensor.

7. The image sensor of claim 6, wherein the video signals are the video stream.

8. The image sensor of claim 6, wherein the input/output port receives the command from an application processor external to the image sensor, and outputs the compute result to the application processor external to the image sensor.

9. The image sensor of claim 6, wherein a compute indicator external to the image sensor is connected to the compute indicator pin.

10. The image sensor of claim 9, wherein working modes of the compute indicator comprise constant on mode, pulsed mode, and color mode.

11. The image sensor of claim 6, wherein an activity indicator driver external to the image sensor is connected to the stream indicator pin and the compute indicator pin, and wherein the activity indicator driver drives an activity indicator.

12. The image sensor of claim 11, wherein working modes of the activity indicator comprise constant on mode and pulsed mode.

13. An image sensor comprising:
- an input/output port for receiving a command from outside of the image sensor;
- a control block for receiving the command from the input/output port, and generating a compute enabled signal;
- a compute block for receiving the compute enabled signal from the control block;
- a pixel array for providing video signals to the compute block;
- wherein the compute block performs computation on the video signals provided by the pixel array to produce a compute result;
- wherein the control block receives the compute result from the compute block, and passes the compute result to the input/output port;
- wherein the input/output port receives the compute result from the control block, and outputs the compute result to outside of the image sensor;
- a compute indicator pin for receiving the compute enabled signal from the control block when the compute block is receiving the compute enabled signal from the control block;
- wherein a terminal of the compute block receiving the compute enabled signal is connected to the compute indicator pin by a conductor; and
- wherein the compute block, the compute indicator pin, and the conductor connecting the terminal of the compute block and the compute indicator pin are sealed in a package of the image sensor.

14. The image sensor of claim 13, wherein the input/output port receives the command from an application processor external to the image sensor, and outputs the compute result to the application processor external to the image sensor.

15. The image sensor of claim 13, wherein a compute indicator external to the image sensor is connected to the compute indicator pin.

16. The image sensor of claim 15, wherein working modes of the compute indicator comprise constant on mode, pulsed mode, and color mode.

17. A method for indicating a video stream being output from a camera system comprising:
- generating a video interface enabled signal by a control block;
- providing the generated video interface enabled signal to a video interface;
- providing the video stream by a pixel array to the video interface;
- providing the video stream received by the video interface to an output port, when the video interface receives the video interface enabled signal;
- wherein an image sensor comprises the control block, the video interface, the pixel array, and the output port, and the camera system comprises the image sensor;
- outputting the video stream by the output port to outside of the image sensor;
- providing the generated video interface enabled signal to a stream indicator pin when the generated video interface enabled signal is provided to the video interface;
- connecting a terminal of the video interface receiving the video interface enabled signal to the stream indicator pin by a conductor; and
- sealing a package of the image sensor including the video interface, the stream indicator pin, and the conductor connecting the terminal of the video interface and the stream indicator pin.

18. The method of claim 17 further comprising:
connecting a stream indicator to the stream indicator pin, wherein the stream indicator is on when the video stream is output from the image sensor of the camera system.

19. The method of claim 17 further comprising:
- generating a compute enabled signal by the control block;
- providing the generated compute enabled signal to a compute block;
- providing video signals by the pixel array to the compute block;
- computing the video signals by the compute block to produce a compute result, when the compute block receives the compute enabled signal;
- providing the compute result to the control block;
- passing the compute result from the control block to an input/output port;
- wherein the image sensor further comprises the compute block and the input/output port;
- outputting the compute result by the input/output port to outside of the image sensor;
- providing the generated compute enabled signal to a compute indicator pin when the generated compute enabled signal is provided to the compute block; and
- connecting a terminal of the compute block receiving the compute enabled signal to the compute indicator pin by a conductor;
- wherein the sealed package of the image sensor further includes the compute block, the compute indicator pin, and the conductor connecting the terminal of the compute block and the compute indicator.

20. The method of claim 19 further comprising:
connecting a compute indicator to the compute indicator pin, wherein the compute indicator is on when the compute block is computing the video signals.

21. The method of claim 19, wherein the video signals are the video stream.

22. The method of claim 19 further comprising:
connecting an activity indicator driver to the stream indicator pin and the compute indicator pin, wherein the activity indicator driver drives an activity indicator.

* * * * *